United States Patent [19]

Huston et al.

[11] 3,941,978
[45] Mar. 2, 1976

[54] AUTOMATIC FILM SEARCHING AND RETRIEVAL SYSTEM

[75] Inventors: James E. Huston, Des Plaines; Robert W. Murre, Chicago, both of Ill.

[73] Assignee: Bell & Howell Company, Chicago, Ill.

[22] Filed: May 8, 1974

[21] Appl. No.: 468,109

[52] U.S. Cl....... 235/61.11 R; 353/26 R; 235/92 V; 235/61.7 R
[51] Int. Cl.² . G03B 23/12; G06G 7/28; G06K 7/10
[58] Field of Search........... 235/92 R, 92 MP, 92 V, 235/61.11 E, 61.11 R, 61.7 R; 360/72; 353/26; 250/570

[56] References Cited
UNITED STATES PATENTS

| | | | |
|---|---|---|---|
| 3,299,272 | 1/1967 | Furukawa | 235/92 V |
| 3,700,320 | 10/1972 | Brewer | 353/26 |
| 3,785,728 | 1/1974 | Peters | 353/26 |
| 3,793,508 | 2/1974 | Maggi | 235/92 V |
| 3,802,771 | 4/1974 | Mickelson | 353/26 |
| 3,812,532 | 5/1974 | Crosser | 353/26 |
| 3,820,884 | 6/1974 | Sone | 353/26 |

*Primary Examiner*—Daryl W. Cook
*Assistant Examiner*—Robert M. Kilgore
*Attorney, Agent, or Firm*—Robert A. Walsh

[57] ABSTRACT

An automatic film retrieval system of the type which utilizes film having a plurality of frames, each frame including document images and an adjacent frame marker to facilitate sensing and counting of the frames has an improved film speed drive control circuit which causes the film to be driven at high speed when a desired film frame is greater than a fixed given number of frames away from the actual present frame and at low speed when the desired film frame is less than or equal to a fixed given number of frames away from the actual present frame. The system additionally has an automatic film drive direction control circuit and a stop-go and reset control circuit.

22 Claims, 9 Drawing Figures

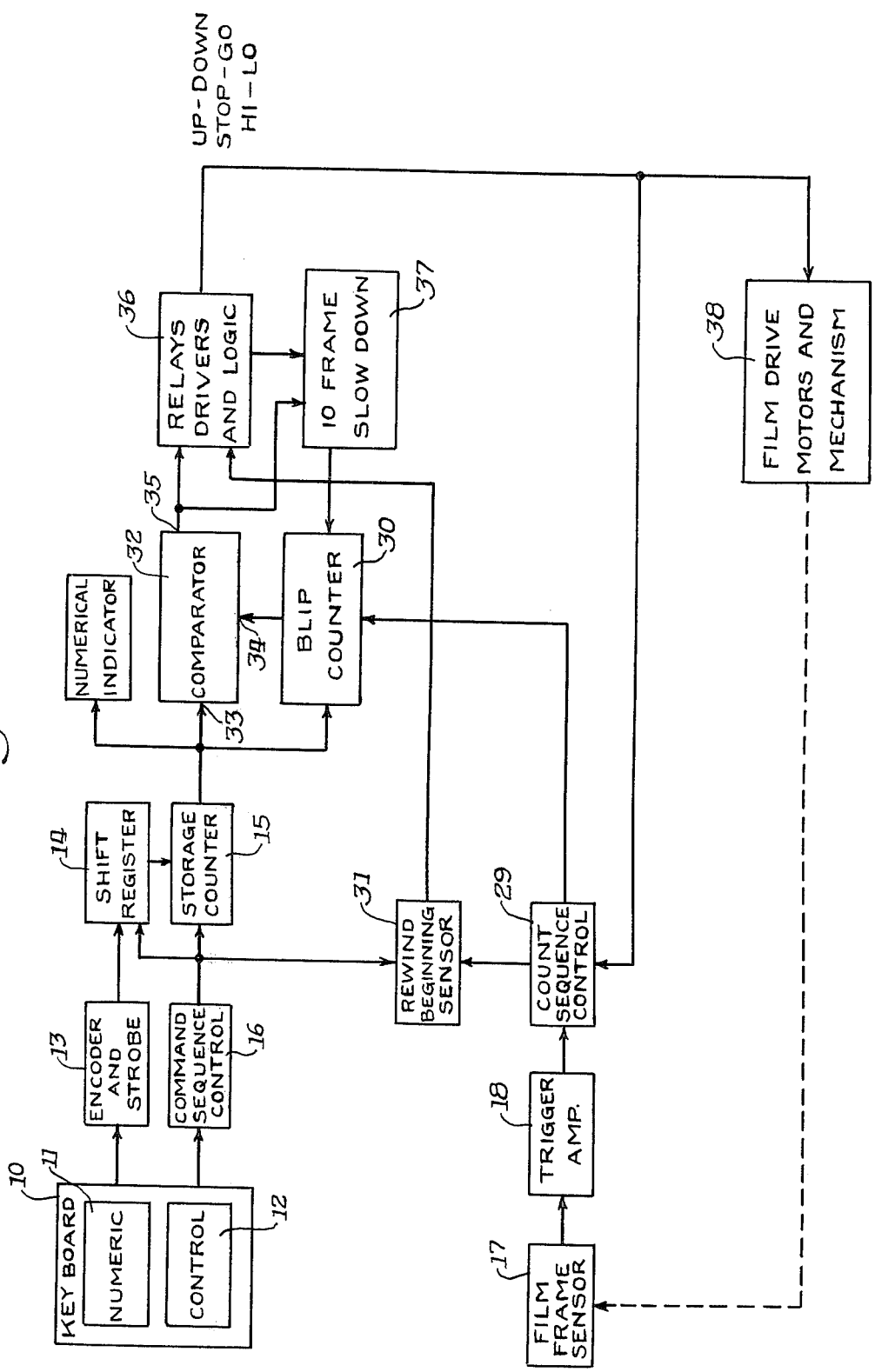

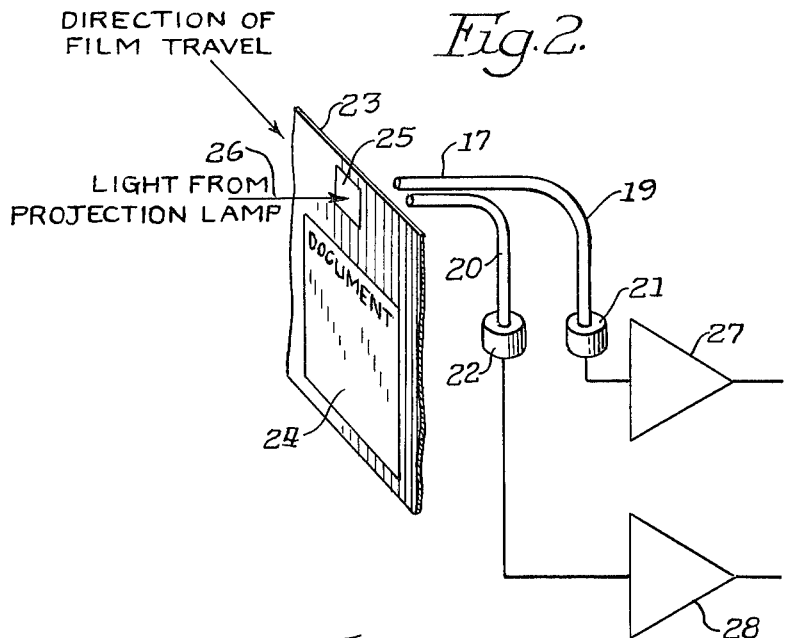

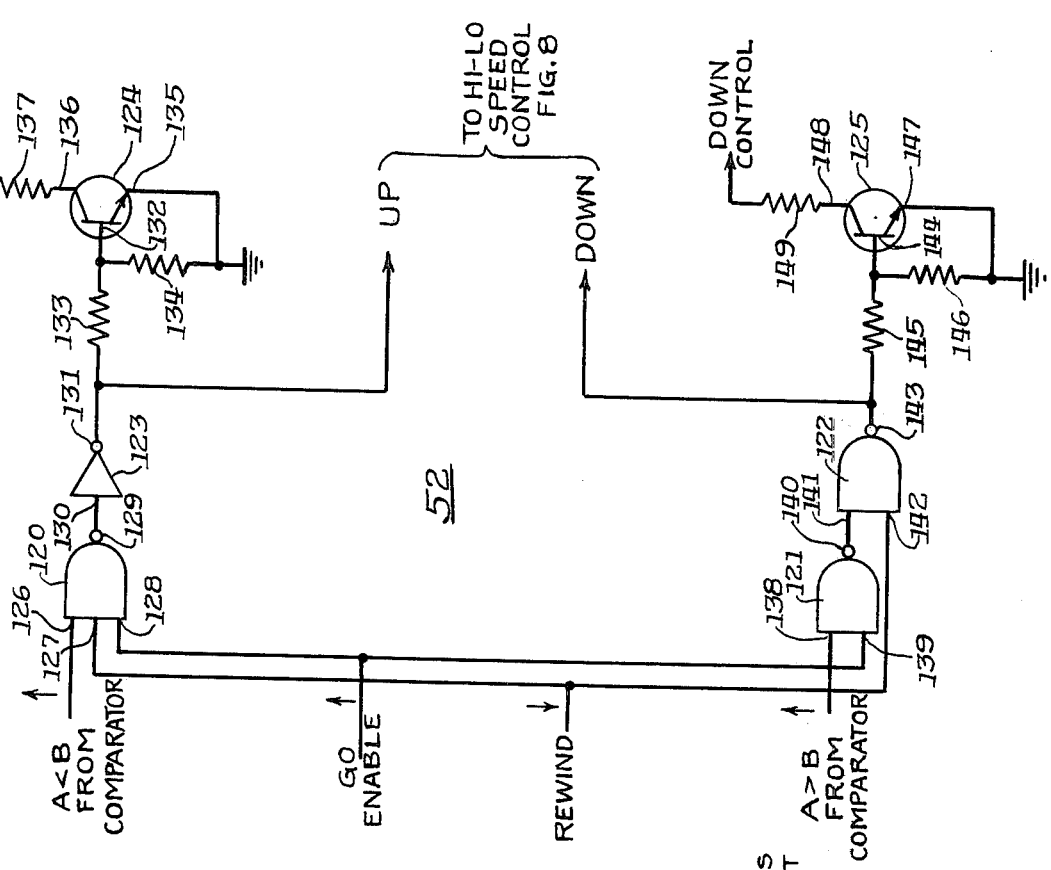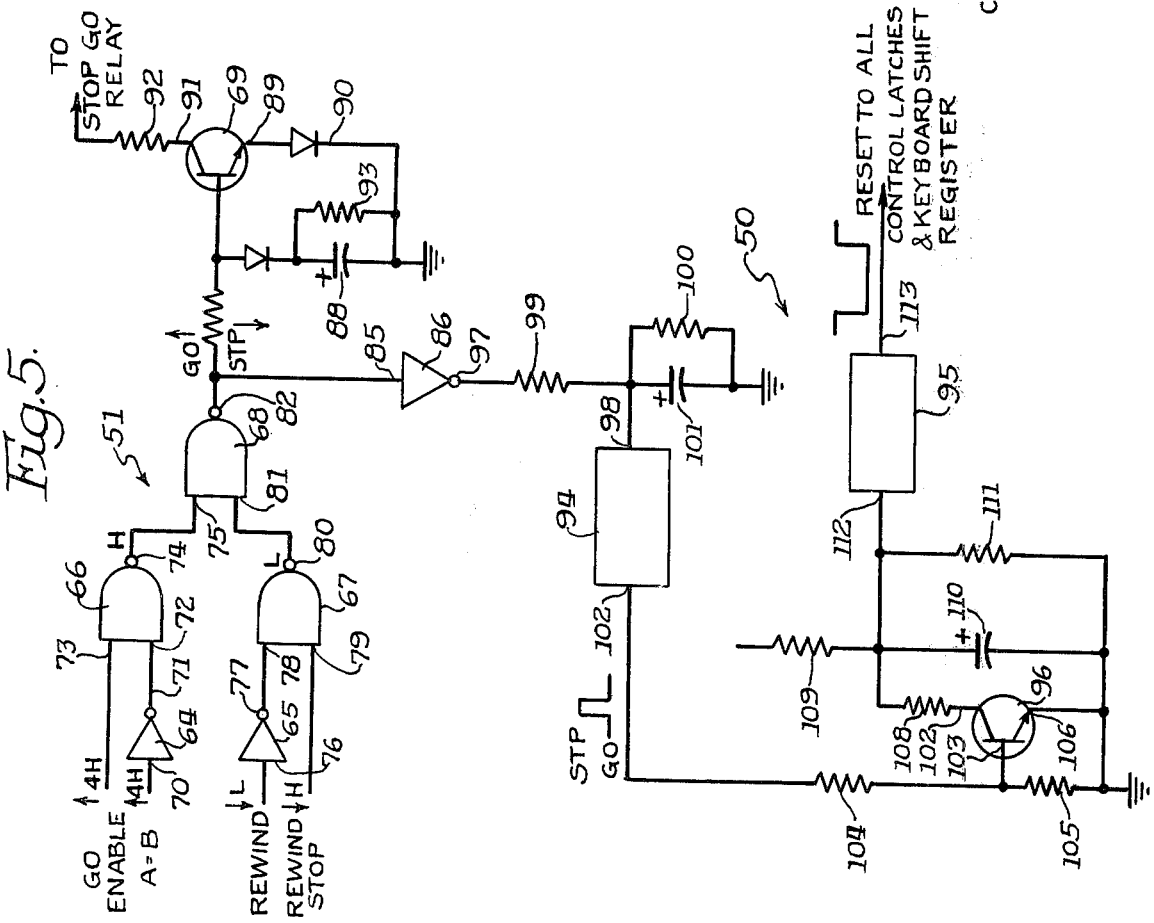

AUTOMATIC FILM SEARCHING AND RETRIEVAL SYSTEM

BACKGROUND OF THE INVENTION

The present invention is generally directed to a microfilm retrieval system and more particularly to a microfilm retrieval system which includes automatic film search control, up-down direction control, and stop-go and reset control.

One efficient type of information storage and retrieval system that has found widespread acceptance is often referred to as microfilm storage. In such systems, copies of documents and data are recorded on film such as 16mm film with the size of the recording on the film being on the order of 1mm per inch of document size. Obviously such size reduction affords a substantial reduction in document storage volume and greatly simplifies handling of the documents. Such a reduction in size necessarily inhibits direct reading of the stored documents and the usual procedure for reading them is to project the microfilm images onto a screen with their magnification to a size corresponding approximately to the original size of the document.

Because literally thousands of documents are stored on each film reel, searching for a particular document can be time consuming. Therefore, to overcome this disadvantage automatic search techniques have been developed. Unfortunately, to avoid damage to the film such techniques have incorporated film handling apparatus which move the film at a relatively low rate of speed when searching for a document to avoid breakage of the film when it is stopped. Additionally, systems for determining in which direction the film must be displaced to arrive at the desired document have been complex. In those systems which displace the film at a high rate of speed, very complicated mechanical arrangements have been necessary for disengaging the drive means and stopping the film to avoid film breakage.

It is therefore a general object of the present invention to provide an improved automatic microfilm retrieval system which affords film searching in a minimum amount of time without breakage of the microfilm.

It is a still further object of the present invention to provide an automatic film drive direction control means for a microfilm retrieval system for determining in what direction the film must be moved to arrive at a desired document.

It is a still further object of the present invention to provide an automatic stop-go and reset control means for a microfilm retrieval system for starting and stopping the film drive and for resetting the system after each document search sequence.

The present invention provides an automatic film searching and retrieval system for use with film having a plurality of frames, each frame including document images and an adjacent frame marker. The system comprises first film drive means for driving the film at a high rate of speed in a given direction, second film drive means for driving the film at a low rate of speed in a given direction and frame marker sensing means for sensing the frame markers and for providing a counting pulse for each marker sensed. The system additionally comprises programming means for preselecting a given film frame represented by a predetermined count, film drive selecting means for actuating either the first or second film drive means, means responsive to the film mark sensing means and the programming means for causing the selecting means to actuate the second film drive means when the total number of the counting pulses differs from the predetermined count by a fixed number of counts, and means for stopping the film when the total number of the counting pulses equals the predetermined count.

The invention additionally provides a film drive direction control circuit for use in an automatic film retrieval system which uses film having a plurality of frames including document images, and has frame sensing and counting means, a programmer for preselecting a given film frame represented by a predetermined count, a comparator for comparing the counting means count with the predetermined count, film drive means capable of driving the film in either a first or second direction, drive enabling means for providing a drive enabling signal and rewind enabling means for initiating a rewind command. The film drive direction control circuit comprises a first gate coupled to the comparator, to the drive enabling means and to the rewind enabling means, and responsive to a first comparator signal when the counting means count is less than the predetermined count, the enabling means drive enabling signal, and the absence of the rewind command to provide a first intermediate drive direction control signal and a first control means coupled to the first gate for providing a first film drive direction control signal in response to the first intermediate drive direction control signal to cause the drive means to drive the film in the first direction.

The film drive direction control circuit additionally comprises a second gate coupled to the comparator and to the drive enabling means and responsive to a second comparator signal when the counting means count is greater than the predetermined count and the enabling means drive enabling signal, to provide a second intermediate drive direction control signal, a third gate coupled to the second gate and to the rewind enabling means for providing a third intermediate direction control signal in response to either the second intermediate control signal or a rewind command signal, and a second control means coupled to the third gate for providing a second film drive direction control signal in response to the third intermediate direction control signal to cause the drive means to drive the film in the second direction.

The invention still further provides a film drive speed control circuit for use in an automatic film searching and retrieval system which utilizes film having a plurality of frames, each frame including document images and having an adjacent frame marker and wherein the system includes a high speed film drive means and a low speed film drive means for driving the film at high and low speeds respectively, frame marker sensing means for sensing the frame markers and for providing a marker pulse corresponding to each marker sensed, counting means for counting the marker pulses, the number of the marker pulses counted representing an actual count, programming means for preselecting a given film frame represented by a predetermined count, and comparator means coupled to the counting means and to the programming means for comparing the counts of the counting means with the predetermined count. The film drive speed control circuit comprises adding means responsive to the comparator means for adding a fixed given number of counts to the actual count to provide an augmented actual count when the actual count is less than the predetermined count and high speed actuating means responsive to the comparator means for actuating the high speed film drive means when the augmented actual count is less than the predetermined count.

The film drive speed control circuit additionally comprises low speed actuating means responsive to the comparator means for providing a low speed drive actuating signal to actuate the low speed film drive means when the augmented actual count equals the predetermined count, subtracting means responsive to the low speed drive means signal for subtracting the fixed number of counts from the augmented actual count to restore the actual count, and stopping means responsive to the comparator means for stopping the low speed drive means when the actual count equals the predetermined count.

The invention still further provides a film drive control circuit for use in an automatic film retrieval system which uses film having a plurality of frames including document images, and has frame sensing and counting means, a programmer for preselecting a given film frame represented by a predetermined count, a comparator for comparing the counting means counts with the predetermined count, film drive means for driving the film and a command unit including a go command means for generating a go command signal, a rewind command means for generating a rewind command signal, and a rewind stop command means for generating a rewind stop command signal. The film drive control circuit comprises go-enable means coupled to the comparator and to the go command means for providing a first intermediate drive comparator when the counting means count is unequal to the predetermined count, rewind enable means coupled to the rewind command means and to the rewind stop command means for providing a second intermediate drive control signal responsive to the rewind command signal and to the absence of the rewind stop command signal, and drive control means coupled to the go-enable means and to the rewind enable means for providing the drive means with a final drive control signal responsive to either the first or second intermediate drive control signals causing the drive means to drive the film.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

FIG. 1 is a block diagram of a microfilm retrieval system embodying the present invention;

FIG. 2 is a partial perspective and block diagram of a document marker sensing means which may be utilized in practicing the present invention;

FIGS. 3a and 3b show the output waveforms of the sensing means of FIG. 2;

FIG. 5 is a schematic circuit diagram of a stop-go and reset control circuit embodying one aspect of the present invention;

FIG. 6 is a circuit diagram of a film drive direction control circuit embodying another aspect of the present invention;

Figure 4:
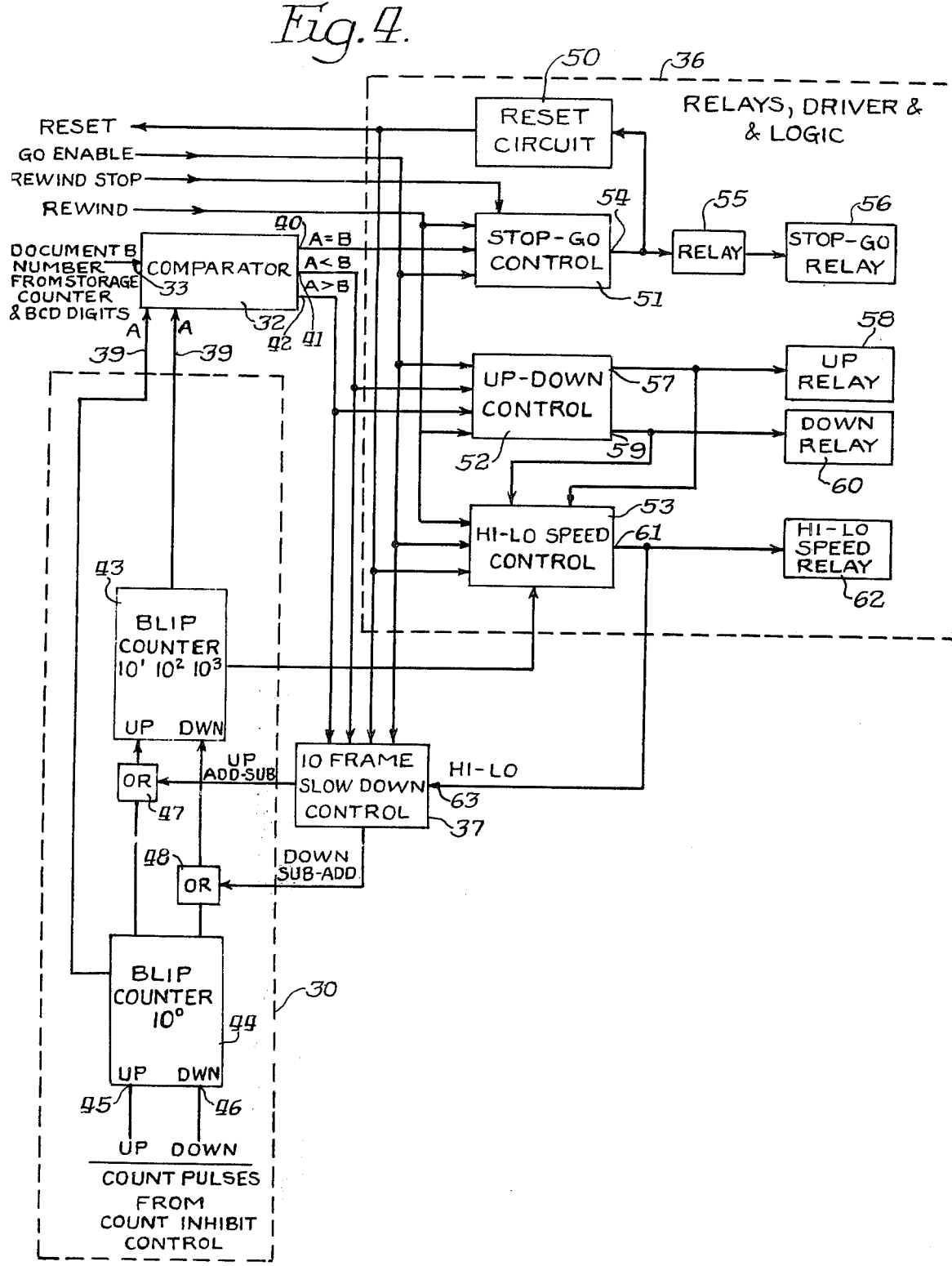
FIG. 4 is an expanded block diagram of a portion of the system shown in FIG. 1.

Referring now to the block diagram representation of the microfilm retrieval system of FIG. 1, the microfilm retrieval system includes a keyboard 10 having a numeric unit 11 and a control unit 12. The numeric unit 11 includes a plurality of keys which are pressed to indicate the number of the desired film frame to be examined. Numeric unit 11 is coupled to encoder and strobe unit 13 which transforms the decimal numeric unit number representation into four, fourbit binary words representing the number of the desired film frame which is then stored in shift register 14. Shift register 14 is coupled to keyboard storage counter 15 which stores the several digits of the number of the desired film frame.

Control unit 12 includes a plurality of keys each indicating a separate system function such as automatic search, rewind, stop, up one, down one, etc. Control unit 12 is coupled to command sequence control unit 16 which receives from control unit 12 the desired function and controls the system in a given sequence to assure that the system operates in a properly timed manner. Command sequence control unit 16 is also coupled to storage counter 15.

To detect which particular film frame is being examined, the system includes film frame marker sensor 17 and trigger amplifier 18. Referring briefly to FIG. 2, film frame marker sensor 17 comprises a pair of light pipes 19 and 20 and a pair of photo cells 21 and 22. As shown in FIG. 2 the microfilm 23 includes film frame 24 which includes the photographic representation of the document it bears and in addition, adjacent to film frame 24 there is a marker 25. Marker 25 as shown is rectangular but of course could be of any desired shape. Each film frame on the microfilm includes an adjacent marker. A light source (not shown) projects light in the direction of arrow 26 through marker 25 to be received by light pipes 19 and 20 as the film marker moves past the light pipes.

The light projected through marker 25 is sensed by photosensors 21 and 22 which generate an output responsive to the light being sensed. Amplifiers 27 and 28 coupled to photosensors 21 and 22 respectively provide an amplified signal of the photosensor outputs.

As the film moves, marker 25 first does not expose either of the light pipes to the light source. Thus, photosensors 21 and 22 will not provide an output. As the film continues to move, marker 25 first exposes light pipe 19 causing photosensor 21 to provide an output, then both light pipes are exposed and both photosensors 21 and 22 will provide outputs, and lastly, as the film continues to move, marker 25 will only expose light pipe 20 causing photosensor 22 to provide an output. Thus it can be seen that in the direction of film movement just described there are four distinct combinations of outputs from photosensors 21 and 22. If the film were reversed to travel in the other direction, there would again be four distinct combinations of outputs from photosensors 21 and 22 but in a different sequence than in the first direction. Therefore, the film frame sensor 17 provides not only a means for counting film frames but additionally provides a means for detecting in which direction the film is traveling.

This may be more clearly seen in FIGS. 3a and 3b which show the representative waveforms from amplifiers 27 and 28 as the film moves. FIG. 3a shows the amplifier outputs as the film moves in the up direction, or in other words, towards higher numbered film frames, and FIG. 3b shows the waveforms as the film moves in the downward direction toward the lower numbered film frames. The frame counting pulses or "blips" are translated to count sequence control unit 29. Count sequence control unit 29 is additionally coupled to blip counter 30.

The count sequence control unit is deviced to take care of an inherent counting problem that arises when the film is stopped in an arbitrary place between marks and is returned to a previously counted mark. By way of example, when the sensor and counter has counted up to and past the twelfth mark and the film is stopped and reversed to go back and find the tenth, as soon as the film returns to the twelfth mark, the counter counts down 1 and shows 11. When the film moves down to the eleventh mark, the counter would count down one more, 10, and stop the film at the wrong frame. The count sequence control inhibits counting the next mark after a direction change either up or down.

Count sequence control unit 29 is additionally coupled to rewind beginning sensor unit 31. Rewind beginning sensor unit 31 is a specialized circuit which stops the rewind mechanism in response to the absence of blips. At the rewind end of the film there preferably is a leader section that does not include on it any markers because there are no pictures. The circuit includes a charging capacitor which is charged between blips and is discharged whenever the blip is sensed. When the charges are permitted to build up to within a certain level the capacitor has not been discharged and thus indicates that there are no more blips. The rewind mechanism is therefore actuated for stopping the film. As shown, rewind beginning sensor 31 is also coupled to blip counter unit 30 to inhibit counting during rewind.

Keyboard storage counter 15 and blip counter 30 are coupled to comparator 32. Keyboard storage counter 15 is coupled to comparator 32 at input 33 designated B and blip counter 30 is coupled to the comparator at input 34 designated A. The B inputs from the keyboard storage counter provides the comparator with the number of the desired film frame and the A inputs from the blip counter provides the comparator with the actual number of the particular document film frame marker exposing the light pipes of the film frame sensor.

The comparator provides a number of operating functions for the overall system. Particularly, it provides at output 35 outputs indicating when the B input equals the A input, or in other words, when the desired film frame has been found, and also output signals indicating when the desired film frame is above or below the actual film frame indicated by the A input. Output 35 of comparator 32 is coupled to the relay drivers and logic unit 36. Also coupled to the relays, drivers and logic unit 36 is rewind beginning sensor 31.

A ten frame slow down unit 37 is coupled to the relays, drivers and logic unit 36, comparator output 35, and blip counter 30. Briefly, its function is to provide a signal which effects blip counter 30 to cause the system to switch from a high speed film handling mode to a low speed film handling mode when the film gets to within ten frames of the desired film frame number. Its function will be described in more detail later.

The relays, drivers and logic circuit 36 is additionally coupled to film drive motors and mechanism unit 38. Unit 38 includes a pair of motors, a high-speed motor and a low speed film drive motor. The high speed motor is preferably a constant high speed motor and the low speed motor is preferably a variable low speed motor for manual operation. During automatic operation, the variable potentiometer which is used to vary the speed of the low speed motor is switched out of the circuit by a manual automatic relay and a fixed potentiometer is used to replace it. Therefore, during automatic operation, a fixed high speed and a fixed low speed motor are used.

Just prior to the film being stopped, the system will be in the low speed mode. The fixed low speed is preferably selected to allow for the maximum rate of movement of the film without excessive overshooting at the stop command. This depends upon the dynamics of the mechanism film spool combination and is set by trial and error for the worst case loading condition.

Referring now to FIG. 4, there is shown in greater detail the loop formed by comparator 32, relays, drivers and logic unit 36, blip counter 30, and ten frame slow-down unit 37. Relays, drivers and logic unit 36 provides a control interface between command sequence control unit 16 via rewind beginning sensor unit 31 and the film drive motors and mechanism 38. It receives go enable, rewind stop, and rewind command signals from the command sequence control unit 16 and depending upon the state of comparator 32, provides control signals for actuating a stop-go relay, an up-down relay, or a high-low speed relay for controlling the high and low speed motors of the film drive motors and mechanism 38.

Comparator 32 is of the type well known in the art and includes four standard 5 bit comparators such as type 9324 manufactured by Fairchild Instruments that are connected in series to compare two four-digit binary-coded-decimal numbers as previously described. The A inputs 39 are coupled to the blip counter 30 and the B inputs 33 is coupled to the keyboard storage counter 15 as shown in FIG. 1. Comparator 32 provides at its outputs 40, 41 and 42 voltage levels indicative of the number of the document marker detected by the film frame sensor as compared to the desired document number as stored in the storage counter 15. For example, when the desired document number equals the actual document number output 40 will provide a logical 1 or a high output signal. When the desired document number is higher than the actual document number output 41 provides a logical 1 and when the actual document number is higher than the desired document number output 42 provides a logical 1.

Blip counter 30 is shown in block diagram form as comprising a first counter 43 for counting tens, hundreds and thousands and for providing a borrow signal when necessary as explained later and a second counter 44 for counting units. Blip counter 30 receives up count pulses at input 45 and down count pulses at input 46 of the second counter 44. Coupling the first and second counters are OR gates 47 and 48 which are coupled to the ten frame slow down control unit 37. The OR gates responsive to the ten frame slow down control unit 37 cause a count of 10 to be added or subtracted from blip counter 43 for ultimately causing the system drive motors to switch from the high speed mode to the low speed mode as more fully explained hereinafter.

Relays, drivers and logic unit 36 comprises reset circuit 50, stop-go control circuit 51, up-down control circuit 52, and high-low speed control circuit 53. Reset circuit 50 is coupled to stop-go control circuit 51 and also to ten frame slow-down control unit 37 and additionally to the keyboard shift registers and to all of the control bistable circuits. The reset signal is used to reset the keyboard shift registers to 0 and all the control bistable circuits to the right state after the completion of an automatic operation.

Stop-go control circuit 51 is coupled to the command sequence control unit and receives therefrom rewind and go enable inputs and a stop signal from the rewind beginning sensing unit. The stop-go control circuit 51 is additionally coupled to output 40 [A = B] of comparator 32. Output 54 of stop-go control circuit 51 is coupled to a delay circuit 55 which is in turn coupled to the stop-go relay 56 of the system.

Up-down control circuit 52 is coupled to the command sequence control unit and receives therefrom go enable, and rewind command inputs. It is additionally coupled to comparator 32 at outputs 41 and 42 for receiving A < B and A > B inputs. Output 57 of up-down control circuit 52 is coupled to the up relay 58 which sets the drive motors in the up direction when actuated. Output 59 is similarly coupled to down relay 60 which sets the drive motors in the down direction when actuated.

High-low speed control circuit 53 is coupled to the up-down control circuit outputs 57 and 59. High-low speed control circuit 53 is additionally coupled to the command sequence control unit and receives therefrom rewind and go enable command inputs. Output 61 is coupled to the high-low speed relay 62 which engages the high or low speed motors responsive thereto.

Ten frame slow down unit 37 is coupled to comparator 32 at outputs 41 and 42 to receive A < B and A > B inputs respectively therefrom. Ten frame slow down circuit 37 is additionally coupled to the reset circuit 50 and to command sequence control units 16 for receiving go enable command inputs. Input 63 of the ten frame slow down control unit 37 is coupled to output 61 of the high-low speed control circuit 53.

Referring now to FIG. 5, there is shown a detailed circuit diagram of the reset circuit 50 and stop-go control circuit 51 embodying the present invention. Stop-go control circuit 51 comprises nverters 64 and 65, NAND gates 66, 67 and 68 and transistor 69. Inverter 64 has an input 70 coupled to the comparator circuit output 40 (FIG. 4) to receive therefrom the A=B signal. Output 71 of inverter 64 is coupled to input 72 of NAND gate 66. NAND gate 66 has input 73 coupled to the command sequence control unit and receives go enable command signals therefrom. Output 74 of NAND gate 66 is coupled to input 75 of NAND gate 68. Inverter 65 has input 76 coupled to the command sequence control unit to receive therefrom rewind command signals. Output 77 of inverter 65 is coupled to input 78 of NAND gate 67. Input 79 of NAND gate 67 is coupled also to the command sequence control unit and receives rewind stop command signals. Output 80 of NAND gate 68 is coupled to resistor 83 which in turn is coupled to base 84 of transistor 69. Output 82 is additionally coupled to input 85 of inverter 86.

Base 84 of transistor 69 is coupled to diode 87 which is coupled to ground via capacitor 88. Emitter 89 is coupled to ground through diode 90. Collector 91 is coupled through resistor 92 to the stop-go relay of the system.

The stop-go control circuit takes the go enable or the rewind command signal inputs and generates at collector 91 a go signal energizing the stop-go relay. When the desired document number is found [A = B], or when the rewind stop signal appears at input 79, a stop signal is generated at collector 91 to de-energize the stop-go relay.

When a rewind operation is initiated, the go enable input 73 of NAND gate 66 will be low, the A = B input 70 of inverter 64 will be high or low, the rewind stop input 79 will be high and the rewind input 76 will be low. The low input at input 73 causes output 74 to be high. The low rewind signal at input 76 causes output 77 of inverter 65 to be high and the high rewind stop input at input 79 together with the high input at input 78 causes NAND gate 67 at output 80 to be low. Therefore, there is a high input at input 75 and a low input at input 81 of NAND gate 68 causing output 82 to be high. The high output at output 82 causes transistor 69 to be forward biased and provides at collector 91 a go signal to the stop-go relay to energize the stop-go relay. Capacitor 88 and resistor 83 form a delay circuit and slow the turn on action of transistor 69 so that other circuit operations within the system can take place before the stop-go relay is energized. Diodes 87 and 90 isolate this delay so that it is effective only for the turn on of transistor 69 but not when transistor 69 is turned off. Resistor 93 provides a discharge path for capacitor 88 when transistor 69 turns off and also a path for collector leakage current.

When the beginning frame is reached, a rewind stop signal is generated by the rewind beginning sensor 31 (FIG. 1) and the rewind stop line goes low. This low input at input 79 of NAND gate 67 causes its output 80 to be high. Inputs 75 and 81 will both be high causing output 82 to be low. This low output is the stop signal and turns transistor 91 off de-energizing the stop-go relay.

A go-enable signal is provided in the command sequence control unit when the required film frame number is inserted into the keyboard storage counter and when the automatic film search button is pushed on control unit 12. In this case, the rewind stop input at input 79 will be high and the rewind signal inputs at input 76 will be high. The A=B signal from the comparator will be low and the go enable input 73 will be high. The high rewind input at input 76 of the inverter 65 will cause output 77 to be low which causes output 80 of NAND gate 67 to be high. The low input at input 70 of inverter 64 causes output 71 to be high and the high go enable input at input 73 combined with the high input at input 72 causes output 74 of NAND gate 66 to be low. Therefore, there is a high input at input 81 and a low input at input 75 at NAND gate 68 which causes output 82 to be high indicating a go signal. The high output at output 82 will turn on transistor 69 after a short delay due to resistor 83 and capacitor 88. When the desired film frame is reached, the A=B input at input 70 of inverter 64 will go high causing output 71 to go low thus causing the output 74 of NAND gate 66 to be high. Therefore, both input 75 and input 81 will be high causing output 82 of NAND gate 68 to be low indicating a stop signal. The low output causes transistor 69 to turn off and to de-energize the stop-go relay.

Reset circuit 50 comprises inverter 86, positive Schmitt one shot trigger-94, Schmitt trigger 95, and transistor 96. Output 97 of inverter 86 is coupled to input 98 of Schmitt trigger 94 through resistor 99. Input 98 of Schmitt trigger 94 is also coupled to ground through the parallel combination of resistor 100 and capacitor 101. Output 102 of Schmitt trigger 94 is coupled to the base 103 of transistor 96 through resistor 104. Base 103 is additionally coupled to ground through resistor 105. The emitter 106 of transistor 96 is coupled to ground and the collector 107 is coupled to a positive voltage source through the series combination of resistors 108 and 109. The common junction of resistors 108 and 109 is coupled to ground through the parallel combination of capacitor 110 and resistor 111. Schmitt trigger 95 has input 112 coupled to the common junction of resistors 108, 109, and 111 and capacitor 110. The output 113 of Schmitt trigger 95 is coupled to the keyboard shift register and to all of the bi-stable circuits of the system. The reset signal produced at output 113 resets the keyboard shift registers to zeros and all the control bi-stable circuits to the proper state.

In operation, after an automatic search operation is completed, the stop signal, the low going signal at output 82 of NAND gate 68 is used to generate the reset signal. This low going signal is delayed, shaped into a pulse and stretched and formed into a relatively long, low going, rectangular pulse. The delay is included so that although a short transient positive pulse on the A = B input may cause output 82 of NAND gate 68 to go low temporarily, it will not generate a reset signal. The stretching is done so that the reset signal will be present long enough at the input of the storage counter to inhibit the clearing of the storage counters when the keyboard shift registers are cleared to zeros by the reset signal action.

As shown, output 82 of NAND gate 68 is coupled to input 85 of inverter 86. The output 97 of inverter 86 is connected to a delay circuit comprising resistors 99 and 100 and capacitor 101. The delayed output from output 97 is coupled to input 98 of Schmitt trigger 94 which is a positive one-shot trigger.

When the output of NAND gate 68 goes low (stop signal), the output 97 of inverter 86 goes high and capacitor 101 begins to charge. When the voltage across capacitor 101 reaches the firing level of Schmitt trigger 94, a single positive pulse appears at output 102. This positive pulse forward biases transistor 96 turning it on long enough to discharge capacitor 110. This causes the output of Schmitt trigger 95 to go low. As soon as the positive pulse passes, transistor 96 turns off and capacitor 110 starts to charge. When the voltage across capacitor 110 reaches the firing level of Schmitt trigger 95, the output 113 of Schmitt trigger 95 goes high completing the low going rectangular pulse.

When the system is initially energized, capacitor 110 is discharged and its voltage is zero. As a positive voltage source comes up, the logic circuits are activated, but capacitor 110, being discharged, holds the input to Schmitt trigger 95 low. This causes output 113 to be low, which is a reset signal. As the voltage across capacitor 110 rises, the trigger level is reached and output 113 of Schmitt trigger 95 goes high, ending the reset signal.

Therefore, it can be seen, that the reset circuit of FIG. 5 generates a reset signal when the system is first initially energized and after each automatic operation is completed. The reset signal is stretched so that the reset signal will be present long enough at the input of the storage counter clear input to inhibit the clearing of the storage counters when the keyboard shift registers are cleared to zeros by the reset signal action.

Referring now to FIG. 6, there is shown a film drive direction control circuit 52 embodying another aspect of the present invention. It comprises NAND gates 120, 121 and 122, inverter 123 and transistors 124 and 125. NAND gate 120 has three inputs, input 126 coupled to output 41 of comparator 32 to receive A < B signals, input 127 coupled to the command sequence control for receiving rewind command signals, and input 128 coupled also to the command sequence control unit for receiving go enable command signals. Output 129 of NAND gate 120 is coupled to input 130 of inverter 123. Output 131 of inverter 123 is coupled to the base 132 of transistor 124 through resistor 133. Base 133 is also coupled to ground through resistor 134 and emitter 135 of transistor 124 is also coupled to ground. Collector 136 is coupled to the up relay of the system through resistor 137.

NAND gate 121 has two inputs, input 138 coupled to output 42 of comparator 32 for receiving A > B signals, and input 139 coupled to the command sequence control unit for receiving go enable command signals therefrom. Output 140 of NAND gate 121 is coupled to input 141 of NAND gate 122. Input 142 of NAND gate 122 is coupled to the command sequence control unit for receiving rewind command signals. Output 143 of NAND gate 122 is coupled to the base 144 of transistor 125 through resistor 145. Base 144 is also coupled to ground through resistor 146 and emitter 147 is also coupled to ground. Collector 148 is coupled to the down relay of the system through resistor 149.

Output 131 of inverter 123 and output 143 of NAND gate 122 are coupled to the high-low speed control circuit of FIG. 7 for reasons to be explained later.

In operation, the up-down detection control circuit takes the go enable signal from the command sequence control unit and combines it with either a high A < B or A > B output of the comparator to generate a relay drive signal for either the up relay or the down relay respectively. Remembering for the moment that the A inputs to the comparator are coupled to the blip counter outputs and the B inputs are coupled to the keyboard storage counter outputs, any time both inputs are the same, and A = B output of the comparator is high and the A > B and A < B outputs are low. When the comparator A < B output is high, the A > B and the A = B outputs will be low, and the blip count will be lower than the desired keyboard number and the film should therefore be moved in the up direction. In like manner, when the comparator output A > B is high, the A < B and A = B outputs will be low, and the blip count will be higher than the keyboard number and the film should be moved in the down direction.

If the desired document number in the keyboard storage counter is higher than the document number in the blip counter, the A < B comparator output will be high and the A > B output will be low. Therefore, input 126 of NAND gate 120 will be high and input 138 of NAND gate 121 will be low. When the automatic search button is pushed, the rewind signal input at inputs 127 of NAND gate 120 and 142 of NAND gate 122 will be high and the go enable input at input 128 of NAND gate 120 and input 139 of NAND gate 121 will be high. Thus, all of the inputs to NAND gate 120 are high, and its output at output 129 will be low. The input to inverter 123 goes low and its output 131 goes high. This turns on transistor 124 for energizing the up relay. Because the A > B input 138 remains low and the rewind signal remains high, NAND gate 121 will have a high at output 140, and the two high inputs at NAND gate 122 causes its output 143 to be low keeping transistor 125 turned off. Therefore, the down relay will remain de-energized.

If the number inserted into the keyboard storage counter is lower than the document number in the blip counter, the A > B comparator output will be high and the A < B output will be low. Therefore, input 138 of NAND gate 121 will be high and input 126 of NAND gate 120 will be low. When the go enable input at inputs of NAND gate 120 and input 139 of NAND gate 121 goes high, the two high inputs at NAND gate 121 will cause its output 143 to be low and although the rewind input remains high at input 142 of NAND gate 122, the low input at input 141 of NAND gate 122 causes output 143 to go high turning on transistor 125 to energize the down relay. Because the A less than B input 126 remains low, NAND gate 120 at its output 129 remains high, and the inverter output remains low keeping transistor 124 turned off and the up relay de-energized.

Although either the A < B or A > B inputs may go high immediately after the desired document number is selected at the keyboard storage counter, the respective relays are not energized until the film search button is pushed thus generating a go enable command signal. Therefore, the NAND gates 120 and 121 will be allowed to respond to the A < B or A > B inputs respectively.

Whenever a rewind signal is generated, the rewind inputs go low thus overriding the A < B, A > B, and the go enable inputs. A low rewind input at input 127 of NAND gate 120 holds the output 129 of NAND gate 120 high causing inverter 123 to produce at its output 131 a low signal keeping transistor 124 turned off. A low rewind signal also holds the output of NAND gate 122 high keeping transistor driver 125 turned on and the down relay energized. Thus, it is insured that the film will always move in the down direction when a rewind signal appears.

When the film blip count reaches the desired document number, the A < B or A > B output that was high goes low, and the A = B input goes from low to high. Both transistors 124 and 125 are turned off and both relays are de-energized.

Thus it can be seen that the film drive direction control circuit of the present invention automatically controls the direction that the film must be moved to search for the desired film frame number. The direction control circuit operates in such a way as to render the up or down decision unambiguous and also allows a rewind signal to override the circuits operation to insure that the film will move backward when a rewind signal is generated.

Figure 7:
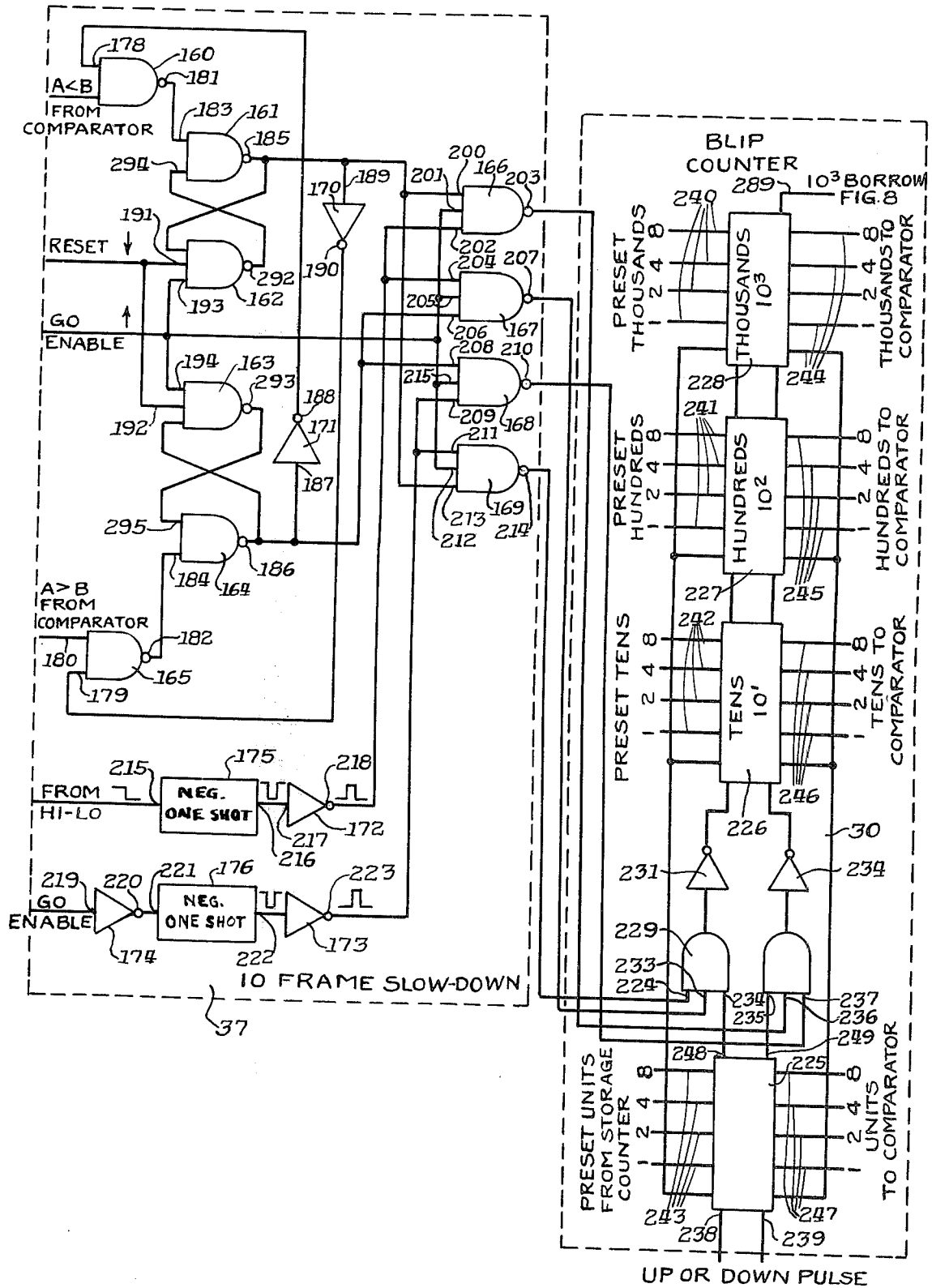
FIG. 7 is a logic block diagram showing in greater detail a portion of the film speed drive control circuit embodying another aspect of the present invention.
Figure 8:
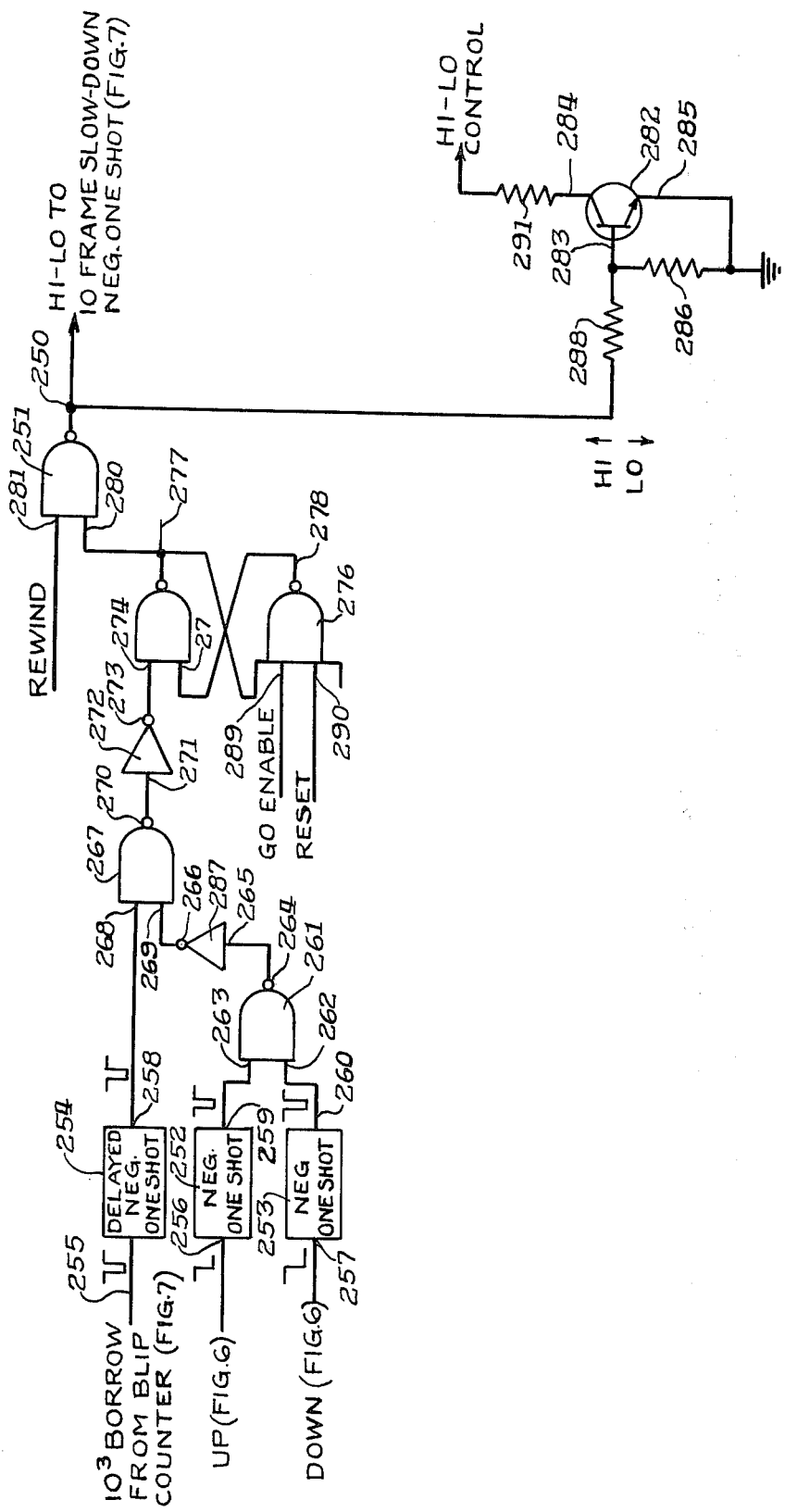
FIG. 8 is a circuit diagram partially in block form of another portion of the film speed control circuit embodying the present invention.

Referring to FIGS. 7 and 8, FIG. 7 shows a detail logic diagram of the ten frame slow-down circuit 37, a detailed block representation of the blip counter 30 and the interconnections between the two. FIG. 8 shows a detailed schematic diagram of the high-low speed control circuit 53. (FIG. 4). The ten frame slow-down circuit 37 and the high-low speed control circuit 53 in conjunction with the blip counter 30 provides the function of slowing down the film when it is a predetermined number of frames away from the desired film frame during an automatic search operation. As previously explained, during the automatic search operation, two film drive motors are utilized. One motor is a high speed motor and the other is a low speed motor. When the automatic search is initiated, if the desired film frame is more than the predetermined number of film frames from the actual film frame stored in the blip counter, the film is driven at high speed in the direction of the desired document and switched to low speed when the actual film frame in the blip counter is the predetermined number of film frames away from the desired film frame. When the desired film frame is reached, the film is stopped.

The purpose of slowing down the film as it approaches the desired film frame is to assure that the film is not damaged when the film is brought to a stop. A fixed low speed is selected that will allow the maximum rate of movement of the film without excessive overshooting of the film frames at the stop command. As previously mentioned this depends upon the dynamics of the mechanism-film spool combination and is set by trial and error for the worst case loading condition. The inertia of the system tends to smooth the transitions between high and low speeds and between low speed and stop. While ten frames of film is considered sufficient for the transitions between the high to low speeds and low speed to stop for the worst case, other predetermined number of frames may also be utilized to accommodate a particular film handling mechanism. A solenoid operated brake on the supply reel is actuated momentarily when the film is switched from a high to low speed to prevent film spillage and the resultant delay in taking up the excess of film.

Referring now to FIG. 7, the ten frame slow-down circuit 37 comprises NAND gates 160 through 169, inverters 170 through 174, and negative one shot Schmitt triggers 175 and 176.

NAND gates 161 and 162, and NAND gates 63 and 64 are interconnected forming a familiar bi-stable circuit well known in the art. Input 177 of NAND gate 160 is coupled to output 41 of comparator 32 (FIG. 4) to receive A < B signals from the comparator. Output 181 of NAND gate 160 is coupled to input 183 of NAND gate 161.

Input 180 of NAND gate 165 is coupled to output 42 of comparator 32 (FIG. 4) to receive A > B inputs from the comparator. Output 182 of NAND gate 165 is coupled to input 184 of NAND gate 164.

Input 191 of NAND gate 162 and input 192 of NAND gate 163 are connected to the reset line at the output 113 of Schmitt trigger 95 (FIG. 5). When the system is initially energized or after the completion of an automatic search operation, the reset signals at inputs 191 and 192 reset the bi-stable circuits to their proper state.

Output 185 of NAND gate 161 is coupled to input 189 of inverter 170. Output 190 of inverter 170 is coupled to input 179 of NAND gate 165.

Output 186 of NAND gate 164 is coupled to input 187 of inverter 171 and output 188 of inverter 171 is coupled to input 178 of NAND gate 160. Output 185 is additionally coupled to input 200 of NAND gate 166 and input 213 of NAND gate 169. Output 186 of NAND gate 164 is additionally coupled to input 206 of NAND gate 167 and input 208 of NAND gate 168. Inputs 201 of NAND gate 166, 205 of NAND gate 167, 295 of NAND gate 168, and 212 of NAND gate 169 are all coupled to the go enable line from the command sequence control unit 16 (FIG. 1).

Input 215 of negative one shot Schmitt Trigger 175 is coupled to output 250 of NAND gate 251 of the high-low speed control circuit shown in FIG. 8. Output 216 of Schmitt trigger 175 is coupled to input 217 of inverter 172. Output 218 of inverter 172 is coupled to inputs 202 of NAND gate 166 and input 204 of NAND gate 167.

Input 219 of inverter 174 is coupled to the go enable line of the command sequence control unit. Output 220 of inverter 174 is coupled to input 221 of Schmitt trigger 176. Output 222 of Schmitt trigger 176 is coupled to the input of inverter 173. Output 223 of inverter 173 is coupled to input 209 of NAND gate 168 and 211 of NAND gate 169.

Blip counter 30 comprises units counter 225, tens counter 226, hundreds counter 227 and thousands counter 228. Blip counter 30 additionally comprises NAND gates 229 and 230 and inverters 231 and 232, forming OR gate combinations into the inputs of the tens counter 226. The counters are otherwise interconnected in a well known manner and for that reason their interconnections will not be described in further detail.

Units counter 225 has inputs 238 and 239 which receive the up and down blip counts from the count sequence control unit 29 (FIG. 1). Inputs 240, 241, 242 and 243 are coupled to the preset thousands, hundreds, tens and units respectively from the storage counter 15 (FIG. 1). Outputs 244, 245, 246 and 247 are coupled to the comparator for providing the comparator with the actual film frame blip count number for thousands, hundreds and tens and units respectively.

Output 203 of NAND gate 166 is coupled to input 236 of NAND gate 230. Output 207 of NAND gate 167 is coupled to input 233 of NAND gate 229. Output 210 of NAND gate 168 is coupled to input 237 of NAND gate 230 and output 214 of NAND gate 169 is coupled to input 224 of NAND gate 229.

Referring now to FIG. 8, the high-low speed control circuit thereshown comprises negative one shot Schmitt triggers 252 and 253, delayed negative one shot Schmitt trigger 254, NAND gates 261, 267, 275, 276 and 251, inverters 287 and 272 and transistor 282. Input 255 of delayed negative one shot Schmitt trigger 254 is coupled to borrow output 289 of thousands counter 228. Output 258 of delayed negative one shot Schmitt trigger 254 is coupled to input 268 of NAND gate 267.

Input 256 of Schmitt trigger 252 is coupled to output 131 of inverter 123, the up-down direction control circuit (FIG. 6). Output 259 is coupled to input 263 of NAND gate 261. Input 257 of Schmitt trigger 253 is coupled to output 143 of NAND gate 122 of the up-down direction control circuit (FIG. 6). Output 260 of Schmitt trigger 253 is coupled to input 262 of NAND gate 261. Output 264 of NAND gate 261 is coupled to input 265 of inverter 287 and the output 266 of inverter 287 is coupled to input 269 of NAND gate 267. Output 270 of NAND gate 267 is coupled to input 271 of inverter 272. Output 273 is coupled to input 274 of NAND gate 275.

NAND gates 275 and 276 are interconnected in a well known bistable ciricuit configuration. Input 289 of NAND gate 276 is coupled to the go enable line from the command sequence control unit. Input 290 is coupled to the reset line from output 113 of Schmitt 195 (FIG. 5). Output 278 is coupled to input 279 of NAND gate 275. Output 277 of NAND gate 275 is coupled to input 280 of NAND gate 251 and input 281 of NAND gate 251 is coupled to the rewind line from the command sequence control unit.

Output 250 of NAND gate 251 is as previously mentioned coupled to the negative one shot Schmitt trigger 175 of the ten-frame slow-down circuit 37 shown in FIG. 7. Output 250 is additionally coupled to base 283 of transistor 282 through resistor 288.

The base 283 of transistor 282 is additionally coupled to ground through resistor 286. Emitter 285 is also coupled to ground. Collector 284 of transistor 282 is coupled to the high-low speed relay through resistor 291. The high-low speed relay is the relay which switches the system from the high speed motor to the low speed motor and is normally biased to energize the high speed motor.

In operation, before an automatic search operation is conducted, all of the bistable circuits of the system are reset by the reset pulse generated from Schmitt trigger 95 of FIG. 5. The low reset signal at input 191 of NAND gate 162 and 192 of NAND gate 163 causes output 292 of NAND gate 162 to be high and output 293 of NAND gate 163 to be high. Therefore, inputs 294 of NAND gate 161 and input 295 of NAND gate 164 are high.

Assuming now that the operator wishes to select a film frame having a number greater than the predetermined number of frames (10 frames) from the actual film frame number in the blip counter, the A < B input from the comparator at input 177 of NAND gate 160 will be high. In like manner, the A > B input at input 180 of NAND gate 165 will be low. The low input at input 180 causes output 182 to be high. The high input at input 184 together with the high input at input 295 causes output 186 to be low. Inverter 171 inverts the low output and provides a high input at input 178 of NAND gate 160. Therefore, there are two high inputs at the NAND gate 160.

The high inputs at inputs 177 and 178 causes output 181 to go low which in turn causes output 185 to be high. The high output at output 185 is impressed upon inputs 200 of NAND gate 166 and input 213 of NAND gate 169, thus enabling these gates with respect to the up signal. The low output from output 186 is impressed upon inputs 206 of NAND gate 167 and 208 of NAND gate 168.

As a result, output 207 of NAND gate 167 will be high, output 210 of NAND gate 168 will be high. Thus, these gates are inhibited from reacting to their other inputs.

Outputs 185 and 186 will remain in these states until a reset signal occurs at the end of the automatic search operation, no matter how many times the comparator outputs A < B and A > B change levels.

The high level signal from the hi-low speed control impressed on input 215 of negative one shot 175 causes its output 216 to remain high. Output 216 is coupled to input 217 of inverter 172. Inverter 172 inverts the high level signal to a low at its output 218. The low output from output 218 is impressed upon inputs 202 of NAND gate 166 and 204 of NAND gate 167. As a result, output 203 of NAND gate 166 will be high and output 207 of NAND gate 167 will be high, although output 207 of NAND gate 167 is also being held high by the low from output 186 of NAND gate 164 at input 206.

When the high enable command from the command control unit appears at inputs 201 of NAND gate 166, 205 of NAND gate 167, 295 of NAND gate 168 and 212 of NAND gate 169 enabling these gates with respect to their go enable inputs, the high going go enable signal is also impressed on input 219 of inverter 174. Inverter 174 inverts the high going signal to a low going signal at its output 220. Output 220 is coupled to input 221 of negative one shot 176. The low going signal at input 221 is converted to a single low pulse by the negative one shot and appears at its output 222. Output 222 is coupled to inverter 173 and the single low pulse is inverted to a single high pulse which appears at output 223. Output 223 is coupled to input 209 of NAND gate 168 and input 211 of NAND gate 169. Since NAND gate 168 is being inhibited by the low signal on input 208, its output is not affected by the single high pulse. However, inputs 212 and 213 of NAND gate 169 are both high so the single high pulse at input 211 causes a single low pulse at output 214. The outputs of NAND gates 166 and 168 are impressed upon the inputs to NAND gate 230 and the outputs of NAND gates 167 and 169 are impressed upon the inputs of NAND gate 229.

Because input 224 is a single low pulse, the output of 229 will be a high pulse which is then inverted by inverter 231 impressed upon the up side of tens counter 226. This causes the tens counter to add ten digits to the actual number in the blip counter.

While the ten digits are being added to the blip counter, the up-down direction control circuit of FIG. 6 is determining in what direction the film must be moved to reach the desired film frame. Its operation has been described earlier. As previously mentioned, the stop-go control circuit 51 of FIG. 5 has a delayed output to allow the other functions of the system to operate. Therefore, the ten digits are added to the counter and the up-down direction control circuit determines what direction the film must move before drive signal is generated by the stop-go control circuit of FIG. 5.

Now the stop-go control circuit provides its drive signal to the relay that switches the drive motors and the drive motor is set for high speed operation by the high-low speed control circuit of FIG. 8.

Referring now to FIG. 8, inputs to the Schmitt triggers 252, 253 and 254 are normally high and only go low in response to the up-down direction control circuit of FIG. 6, or the thousands borrow signal from the counter of FIG. 2. Therefore, outputs 258, 259 and 260 are all high. Output 264 will therefore be low which is inverted by inverter 287 to provide a high input at input 269 of NAND gate 267. Input 268 will also be high which causes output 270 of NAND gate 267 to produce a low. This low is inverted to a high and is impressed upon input 274 of NAND gate 275.

When the reset pulse was generated at input 290 of NAND gate 276, output 278 went high which was impressed upon input 279 of NAND gate 275. Because both inputs to NAND gate 275 are high, output 277 will produce a low which causes output 250 of NAND gate 251 to be high. The high output at output 250 forward biases transistor 282 which energizes the high-low speed relay causing the high speed motor to be energized to force the film to move in the high speed mode.

Remembering that the counter had added to it ten digits by the go enable signal at input 219 of inverter 174, when the comparator is satisfied, the actual film frame count will still be 10 frames below the desired film frame. However, because the comparator is satisfied, the A < B output of the comparator will go low. Referring back to FIG. 6 and the operation of the film drive direction control circuit thereshown, the low input at input 126 of NAND gate 120 causes output 131 of inverter 123 to go low. This low output is coupled to input 256 of negative one shot Schmitt trigger 252. Of the high-low speed control circuit of FIG. 8, this results in a short low level pulse at output 259 which is impressed upon input 263 of NAND gate 261. The low at input 263 causes a high to be produced at output 264 which is inverted by inverter 287 to a low at input 269 of NAND gate 267. This causes a high to be produced at output 264 which is inverted by inverter 287 to a low at input 269 of NAND gate 267. This causes output 270 to produce a high and output 273 of inverter 272 to produce a low. The low thus impressed upon input 274 of NAND gate 275 causes output 277 to go high forcing output 250 of NAND gate 251 low.

The low going output at output 250 of NAND gate 251 is coupled to the negative one shot Schmitt trigger 175 of FIG. 7 and also to transistor 282. The low signal at base 283 of transistor 282 turns transistor 282 off and causes at the collector 284 a high voltage signal which causes high-low speed relay to switch to the low speed motor.

At the same time, the low going output of NAND gate 251 causes a low pulse out of negative one shot Schmitt trigger 175 which is inverted by inverter 172 to a high pulse which is impressed upon inputs 202 of NAND gate 166 and the input 204 of NAND gate 167. Since the output of NAND gate 167 is being held high by the low input at 206 from output 186 of NAND gate 164 its output is uneffected by the high pulse at its input 204. However, since the other inputs of NAND gate 166 are already high the high pulse at input 202 is gated through and produces a low pulse at output 203. This low pulse is then impressed upon input 236 of NAND gate 230.

The low pulse at input 236 of NAND gate 230 causes a high pulse at the NAND gate output which is inverted by inverter 233 and is impressed upon the down side of counter 226 to cause the tens counter 226 to subtract ten digits from the blip counter. Therefore, the ten digits which were added earlier are not subtracted and the actual marker count is restored.

Once again, the comparator is unsatisfied, and the A < B signal from the comparator goes high causing the film drive direction control circuit to produce an output causing the film to move upward but this time at the low rate of speed.

When the comparator is again satisfied, that is when the desired frame number is equal to the actual frame number in the counter, the A = B output of the comparator will go high and the A < B and A > B outputs will go low. This causes the stop-go control circuit of FIG. 5 to de-energize the drive motor and the film is stopped at the desired film frame.

To further illustrate this aspect of the present invention, a numerical example follows. If the desired document number [B] is 973, and the present film frame

[A] is 721, the difference is 973 − 721 or 252. Therefore, A is less than B so the direction to move the film is up. The go enable signal causes the ten frame slow-down circuit to add ten digits to the present film frame count number, before film starts moving. Therefore, the count number will be 721 + 10 or 731. Now, the difference is 973 − 731 or 242. A is still less than B and the direction is still up.

When the film has moved up the 242 frames, the counter output will show 731 + 242 or 973 which satisfies the comparator. The A < B output goes from high to low and the A = B output goes from low to high. But, the actual film frame count number will be the original film frame count number plus the number of frames moved up before the comparator became satisfied, 721 + 242 or 963 which is 10 frames below the desired document.

The A < B comparator output going from high to low causes the up signal out of the film drive direction control circuit to go low. This causes the high-low speed control to switch to low speed. When the high-low speed signal goes from high to low, the 10-frame slow-down causes 10 to be subtracted from the frames counter output number 973 − 10 or 963 which is the correct film frame count. But the comparator is again dissatisfied and the A < B output goes high again and restores the up signal and the A = B output of the comparator goes low. Because of the delay in the stop-go relay drive line, the system continues to drive but now at low speed for the remaining ten frames. The film stops when the comparator is again satisfied and the A = B output from the comparator goes high and remains high at the desired document.

As can be readily understood, the adding in and subtracting out the 10 digits from the blip counter output does not change the final count. The counter functions are performed within a few microseconds, which is instantaneous compared to the control relay response.

If the desired document is less than the present blip count output by more than ten frames, the action is similar and will therefore not be described in detail. The down signal causes the 10-frame slow-down circuit to first subtract 10 digits from the blip counter at the initiation of the go enable signal and then when the comparator is satisfied the first time, the A > B output from the comparator going low causes the 10 digits to be added back in, and again the speed is changed from high to low.

If the desired document number is less than ten frames away from the preset blip count output number, the system is initially set for low speed operation. For example, if the desired film frame number [B] is 376 and the present number [A] is 371, A is less than B and the direction is up. But, when 10 is added to the present blip counter output number [A], 371 + 10 or 381, now A is greater than B so the direction changes to down. When the high up signal goes low, the high-low speed circuit changes to low speed. The speed change signal again causes the 10 to be subtracted out restoring the counter output to the correct count, namely 371. The A > B signal again goes low and the A < B signal goes high restoring the direction signal to up. The film drives at low speed to the desired document.

If the desired document number were less than the present number by less than 10 frames, the initial operation would be to subtract 10 instead of add, and again the resultant direction change would cause an immediate switch to low speed. The speed change signal would cause the ten to be added in, restoring the correct count and direction. The film would therefore drive at slow speed to the desired document.

If the present number [A] is less than 10, and the desired document number [B] is below that number, the A is greater than B and the direction is down and 10 is subtracted from the blip counter. However, this subtraction would cause a negative number to be indicated in the counter. For that reason, borrow output of thousands counter 228 is used. For example, if the present document number is 8 and the desired document number is 3 the direction is down, and 10 is subtracted. Thus, 8 − 10 is equal to a minus number. But the blip counter indicates the negative number as 9,998 − 10,000. The 9,998 is at the count output and the minus 10,000 is represented by a borrow signal out of the thousands counter 228. In this case, the direction signal does not change. However, the borrow signal from output 289 is used instead to switch to low speed. The action of switching to low speed again causes the count to be restored to 8 and the film moves down at low speed to the desired document, 3 and stops.

Therefore, the present invention provides a microfilm retrieval system which is fully automatic to search for a desired document. The film is moved at a high rate of speed until the desired document is a predetermined number of film frames away from the desired film frame number, and then switches to low speed so that the film is not damaged when it comes to rest. Additionally, the up and down direction of film movement is fully automatic which makes its use convenient to an operator.

While particular embodiments of the invention have been shown and described, modifications may be made, and it is intended in the appended claims to cover all such modifications as may fall within the spirit and scope of the invention.

We claim:

1. An automatic film searching and retrieval system for use with film having a plurality of frames, each frame including document images and having an adjacent frame marker and wherein the system includes a high speed film drive means and a low speed film drive means for driving the film at high and low speeds respectively, said system comprising:

frame marker sensing means for sensing said frame markers and for providing a marker pulse corresponding to each marker sensed;

counting means for counting said marker pulses, the number of said marker pulses counted representing an actual count;

programming means for preselecting a given film frame represented by a predetermined count;

comparator means coupled to said counting means and to said programming means for comparing the counts of said counting means with said predetermined count;

adding means responsive to said comparator means for adding a fixed given number of counts to said actual count to provide an added actual count when said actual count is less than said predetermined count;

high speed actuating means responsive to said comparator means for actuating said high speed film drive means when said added actual count is less than said predetermined count;

low speed actuating means responsive to said comparator means for providing a low speed drive actuating signal to actuate said low speed film drive means when said added actual count equal said predetermined count;

subtracting means responsive to said low speed drive means signal for subtractingg said fixed number of counts from said added actual count to restore said actual count; and stopping means responsive to said comparator means for stopping said low speed drive means when said actual count equals said predetermined count.

2. A system in accordance with claim 1 wherein said low speed actuating means is additionally capable of actuating said low speed drive means when said added actual count is greater than said predetermined count.

3. A system in accordance with claim 1 wherein said subtracting means is additionally responsive to said comparator means for subtracting said fixed given number of counts from said actual count to provide a subtracted actual count when said actual count is greater than said predetermined count, said high speed actuating means is additionally responsive to said comparator means for actuating said high speed film drive means when said subtracted actual count is less than said predetermined count, said low speed actuating means is additionally responsive to said comparator means for providing said low speed drive actuating signal when said subtracted actual count equals said predetermined count and said adding means is additionally responsive to said low speed drive means signal for adding said fixed number of counts to said subtracted actual count to restore said actual count.

4. A system in accordance with claim 3 wherein said low speed actuating means is additioally capable of actuating said low speed drive means when said subtracted actual count is less than said predetermined count.

5. A system in accordance with claim 3 further comprising film drive direction control means coupled to said comparator and to said high and low speed film drive means for providing said drive means with a first direction control signal when said actual count is less than said predetermined count and a second direction control signal when said actual count is greater than said predetermined count to cause said drive means to drive said film in first and second directions respectively.

6. A system in accordance with claim 5 wherein said low speed actuating means is coupled between said direction control means and said drive means and is responsive to the absence of said first and second direction control signals for providing said low speed drive means signal.

7. The film drive direction control circuit for use in an automatic film retrieval system which uses film having a plurality of frames including document images, and has frame sensing and counting means, a programmer for preselecting a given film frame represented by a predetermined count, a comparator for comparing the counting means count with said predetermined count, film drive means capable of driving the film in either a first or second direction, drive enabling means for providing a drive enabling signal and rewind enabling means for initiating a rewind command, the film drive direction control circuit comprising:

a first gate coupled to said comparator, to said drive enabling means and to said rewind enabling means, and responsive to a first comparator signal when said counting means count is less than said predetermined count, said enabling means drive enabling signal, and the absence of said rewind command to provide a first intermediate drive direction control signal;

a first control means coupled to said first gate for providing a first film drive direction control signal in response to said first intermediate drive direction control signal to cause said drive means to drive said film in said first direction;

a second gate coupled to said comparator and to said drive enabling means and responsive to a second comparator signal when said counting means count is greater than said predetermined count and said enabling means drive enabling signal to provide a second intermediate drive direction control signal;

a third gate coupled to said second gate and to said rewind enabling means for providing a third intermediate direction control signal in response to either said second intermediate control signal or a rewind command signal; and a second control means coupled to said third gate for providing a second film drive direction control signal in response to said third intermediate direction control signal to cause said drive means to drive the film in said second direction.

8. A control circuit in accordance with claim 7 further comprising an inverter having an input and an output and wherein said first gate comprises a NAND gate having a first input, a second input, a third input and an output, said first input being coupled to said comparator, said second input being coupled to said drive enabling means, said third input being coupled to said rewind enabling means and said output being coupled to said inverter input and said inverter output being coupled to said first control means.

9. A control circuit in accordance with claim 8 wherein said first control means comprises a transistor having a base and a collector, and wherein said inverter output is coupled to said base and said collector provides said first film drive direction control signal.

10. A control circuit in accordance with claim 7 wherein said second and third gates each comprise a NAND gate having a first input, a second input and an output, said first input of said second gate being coupled to said comparator, said second input of said second gate being coupled to said drive enabling means, and said output of said second gate being coupled to said first input of said third gate, said second input of said third gate being coupled to said second control means.

11. A control circuit in accordance with claim 10 wherein said second control means comprises a transistor having a base and a collector, and wherein said output of said third gate is coupled to said base and said collector provides said second film drive direction control signal.

12. In an automatic film searching and retrieval system for use with film having a plurality of frames, each frame including document images and having an adjacent frame marker and wherein the system includes a high speed film drive means and a low speed film means for driving the film at high and low speeds respectively, frame marker sensing means for sensing said frame markers and for providing a marker pulse corresponding to each marker sensed, counting means for counting said marker pulses, the number of said marker pulses counted representing an actual count, programming means for preselecting a given film frame represented by a predetermined count, and comparator means coupled to said counting means and to said programming means for comparing the counts of said counting means with said predetermined count, a film drive speed control circuit comprising:
- adding means responsive to said comparator means for adding a fixed given number of counts to said actual count to provide an added actual count when said actual count is less than said predetermined count;
- high speed actuating means responsive to said comparator means for actuating said high speed film drive means when said added actual count is less than said predetermined count;
- low speed actuating means responsive to said comparator means for providing a low speed drive actuating signal to actuate said low speed film drive means when said added actual count equals said predetermined count;
- subtracting means responsive to said low speed drive means signal for subtracting said fixed number of counts from said added actual count to restore said actual count; and
- stopping means responsive to said comparator means for stopping said low speed drive means when said actual count equals said predetermined count.

13. A film drive speed control circuit in accordance with claim 12 wherein said low speed actuating means is additionally capable of actuating said low speed drive means when said added actual count is greater than said predetermined count.

14. A film drive speed control circuit in accordance with claim 12 wherein said subtracting means is additionally responsive to said comparator means for subtracting said fixed given number of counts from said actual count to provide a subtracted actual count when said actual count is greater than said predetermined count, said high speed actuating means is additionally responsive to said comparator means for actuating said high speed film drive means when said subtracted actual count is less than said predetermined count, said low speed actuating means is additionally responsive to said comparator means for providing said low speed drive actuating signal when said subtracted actual count equals said predetermined count, and said adding means is additionally responsive to said low speed drive means signal for adding said fixed number of counts to said subtracted actual count to restore said actual count.

15. A film drive speed control circuit in accordance with claim 14 wherein said low speed actuating means is additionally capable of actuating said low speed drive means when said subtracted actual count is less than said predetermined count.

16. A film drive control circuit for use in an automatic film retrieval system which uses film having a plurality of frames including document images, and has frame sensing and counting means, a programmer for preselecting a given film frame represented by a predetermined count, a comparator for comparing the counting means counts with said predetermined count, film drive means for driving the film and a command unit including a go command means for generating a go command signal, a rewind command means for generating a rewind command signal, and a rewind stop command means for generating a rewind stop command signal, the film drive control circuit comprising:
- go-enable means coupled to said comparator and to said go command means for providing a first intermediate drive control signal responsive to said go command signal and said comparator when said counting means count is unequal to said predetermined count;
- rewind enable means coupled to said rewind command means and to said rewind stop command means for providing a second intermediate drive control signal responsive to said rewind command signal and to the absence of said rewind stop command signal; and
- drive control means coupled to said go-enable means and to said rewind enable means for providing said drive means with a final drive control signal responsive to either said first or second intermediate drive control signals causing said drive means to drive said film.

17. A film drive control circuit in accordance with claim 16 wherein said drive control means terminates said final drive control signal responsive to said go enable means and said rewind enable means when said counting means count equals said predetermined count or when said rewind stop command means generates said rewind stop command signal.

18. A film drive control circuit in accordance with claim 16 wherein said go enable means comprises an inverter having an input and an output and a NAND gate having first and second inputs and an output, said input of said inverter being coupled to said comparator, said first NAND gate input being coupled to said go command means, said inverter output being coupled to said second input of said NAND gate, and said NAND gate output being coupled to said drive control means for providing said drive control means with said first intermediate drive control signal.

19. A film drive control circuit in accordance with claim 16 whrein said rewind enable means comprises an inverter having an input and an output and a NAND gate having first and second inputs and an output, said inverter input being coupled to said rewind command means, said inverter output being coupled to said first input of said NAND gate, said second NAND gate input being coupled to said rewind stop command means, and said NAND gate output being coupled to said drive control means for providing said drive control means with said second intermediate drive control signal.

20. A film drive control circuit in accordance with claim 16 wherein said drive control means comprises a NAND gate having first and second inputs and an output, and a transistor having at least a base and a collector, said first NAND gate input being coupled to said go enable means, said second NAND gate input being coupled to said rewind enable means, said NAND gate output being coupled to said base of said transistor, and said transistor collector being coupled to said drive means for providing said drive means with said final drive control signal.

21. A film drive control circuit in accordance with claim 17 which further comprises reset means coupled to said drive control means and responsive to the termination of said final drive control signal for providing a reset signal delayed in time relative to said final drive control signal termination.

22. A film drive control circuit in accordance with claim 21 wherein said reset means comprises:

a first capacitor coupled to said drive control means which is charged when said final drive control signal is terminated;
a first Schmitt trigger coupled to said first capacitor for providing a first delayed pulse when it is charged to its firing voltage by said first capacitor
a second capacitor;
means responsive to said first delayed pulse for discharging said second capacitor and for causing said second capacitor to charge after said first delayed pulse; and
a second Schmitt trigger coupled to said second capacitor for providing said delayed reset signal when said second capacitor is discharged, said reset signal being terminated when said second capacitor is charged to the firing voltage of said second Schmitt trigger.

* * * * *